(12) United States Patent
Kruempelmann et al.

(10) Patent No.: US 11,556,405 B2
(45) Date of Patent: Jan. 17, 2023

(54) TRANSPORTATION OF CONFIGURATION DATA WITH ERROR MITIGATION

(71) Applicant: SAP SE, Walldorf (DE)

(72) Inventors: Wulf Kruempelmann, Altlussheim (DE); Susanne Schott, Mannheim (DE); Jens Berger, Dresden (DE)

(73) Assignee: SAP SE, Walldorf (DE)

( * ) Notice: Subject to any disclaimer, the term of this patent is extended or adjusted under 35 U.S.C. 154(b) by 391 days.

(21) Appl. No.: 16/885,224

(22) Filed: May 27, 2020

(65) Prior Publication Data

US 2021/0373986 A1 Dec. 2, 2021

(51) Int. Cl.
| | |
|---|---|
| *G06F 11/07* | (2006.01) |
| *G06F 16/22* | (2019.01) |
| *G06F 8/41* | (2018.01) |
| *G06F 16/21* | (2019.01) |
| *H04L 67/00* | (2022.01) |

(52) U.S. Cl.
CPC .......... *G06F 11/0709* (2013.01); *G06F 8/433* (2013.01); *G06F 16/212* (2019.01); *G06F 16/2282* (2019.01); *H04L 67/34* (2013.01); *G06F 11/0793* (2013.01)

(58) Field of Classification Search
CPC .... G06F 11/0709; G06F 8/433; G06F 16/212; G06F 16/2282; G06F 11/0793; G06F 16/215; H04L 67/34; H04L 41/0266; H04L 41/0866; H04L 67/02; H04L 67/10
See application file for complete search history.

(56) References Cited

U.S. PATENT DOCUMENTS

| | | | |
|---|---|---|---|
| 2014/0344800 A1* | 11/2014 | Ohs | G06F 8/654 |
| | | | 717/171 |
| 2020/0159524 A1* | 5/2020 | Kruempelmann | G06F 8/71 |
| 2021/0149856 A1* | 5/2021 | Kruempelmann | G06F 16/254 |
| 2021/0377364 A1* | 12/2021 | Kruempelmann | G06F 16/2282 |
| 2022/0147564 A1* | 5/2022 | Deng | G06Q 10/0633 |
| 2022/0188078 A1* | 6/2022 | Coan | G06F 9/451 |

* cited by examiner

*Primary Examiner* — Michael A Keller
(74) *Attorney, Agent, or Firm* — Mintz Levin Cohn Ferris Glovsky and Popeo, P.C.

(57) ABSTRACT

A method for mitigating errors in the transportation of configuration data may include identifying, at a development system, dependent configuration data associated with a first transport request. The dependent configuration data may implement a customization to a software application hosted at a production system. A reference table identifying the dependent configuration data may be sent to the production system. A missing object list identifying dependent configuration data absent from the production system may be generated at the production system based on the reference table. The missing object list may be sent to the development system where a corrective action may be performed such that the dependent configuration data identified by the missing object list as being absent from the production system is sent to the production system in the first transport request and/or a second transport request. Related systems and articles of manufacture, including computer program products, are also provided.

20 Claims, 4 Drawing Sheets

TRANSPORTATION OF CONFIGURATION DATA WITH ERROR MITIGATION

TECHNICAL FIELD

The present disclosure generally relates to cloud computing and, more specifically, to the transportation of configuration data.

BACKGROUND

An application may be hosted by a cloud-computing platform such that the application may be remotely accessible to multiple tenants, for example, over the Internet. For example, the application may be available as a cloud-based service including, for example, a software as a service (SaaS) and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, payroll, time and attendance management, recruiting and onboarding, learning and development, performance and compensation, workforce planning, and/or the like.

SUMMARY

Methods, systems, and articles of manufacture, including computer program products, are provided for mitigating errors during the transport of configuration data. In one aspect, there is provided a system including at least one processor and at least one memory. The at least one memory can store instructions that cause operations when executed by the at least one processor. The operations may include: identifying, at a development system, a plurality of dependent configuration data associated with a first transport request, the one or more dependent configuration data implementing a customization to a software application hosted at a production system; sending, to the production system, a reference table identifying the plurality of dependent configuration data; in response to receiving the reference table at the production system, determining, at the production system, that at least one of the plurality of dependent configuration data included in the reference table is absent from the production system; sending, to the development system, a missing object list identifying the at least one of the plurality of dependent configuration data determined to be absent from the production system; and in response to receiving the missing object list at the production system, performing, at the production system, a corrective action such that the at least one of the plurality of dependent configuration data identified by the missing object list is sent to the production system as part of the first transport request and/or a second transport request.

In some variations, one or more of the features disclosed herein including the following features can optionally be included in any feasible combination. The plurality of dependent configuration data may include a programming code, a schema of one or more database tables operated upon by the programing code, and a content of the one or more database tables.

In some variations, whether the at least one of the plurality of dependent configuration data is included in another transport request destined for the production system may be determined at the production system. In response to determining that the at least one of the plurality of dependent configuration data is included in the second transport request destined for the production system, an alert may be generated to send, to the production system, the second transport request prior to sending the first transport request. In response to determining that the at least one of the plurality of dependent configuration data is not included in another transport request destined for the production system, an alert may be generated to include, in the first transport request, the at least one of the plurality of dependent configuration data.

In some variations, the customization may include an addition, removal, and/or a modification of one or more functionalities of the software application. The software application may operate on one or more database tables in order to perform the one or more functionalities. The software application may be implemented based on a template defining the one or more database tables.

In some variations, the software application may be an enterprise resource planning (ERP) software application, a customer relationship management (CRM) software application, and/or a supply chain management (SCM) software application.

In another aspect, there is provided a method for transporting configuration data across multiple cloud-based systems. The method may include: identifying, at a development system, a plurality of dependent configuration data associated with a first transport request, the one or more dependent configuration data implementing a customization to a software application hosted at a production system; sending, to the production system, a reference table identifying the plurality of dependent configuration data; in response to receiving the reference table at the production system, determining, at the production system, that at least one of the plurality of dependent configuration data included in the reference table is absent from the production system; sending, to the development system, a missing object list identifying the at least one of the plurality of dependent configuration data determined to be absent from the production system; and in response to receiving the missing object list at the production system, performing, at the production system, a corrective action such that the at least one of the plurality of dependent configuration data identified by the missing object list is sent to the production system as part of the first transport request and/or a second transport request.

In some variations, one or more of the features disclosed herein including the following features can optionally be included in any feasible combination. The plurality of dependent configuration data may include a programming code, a schema of one or more database tables operated upon by the programing code, and a content of the one or more database tables.

In some variations, the method may further include: determining, at the production system, whether the at least one of the plurality of dependent configuration data is included in another transport request destined for the production system; in response to determining that the at least one of the plurality of dependent configuration data is included in the second transport request destined for the production system, generating a first alert to send, to the production system, the second transport request prior to sending the first transport request; and in response to determining that the at least one of the plurality of dependent configuration data is not included in another transport request destined for the production system, generating a second alert to include, in the first transport request, the at least one of the plurality of dependent configuration data.

In some variations, the customization may include an addition, removal, and/or a modification of one or more functionalities of the software application. The software application may operate on one or more database tables in order to perform the one or more functionalities. The software application may be implemented based on a template defining the one or more database tables.

In some variations, the software application may be an enterprise resource planning (ERP) software application, a customer relationship management (CRM) software application, and/or a supply chain management (SCM) software application.

In another aspect, there is provided a computer program product that includes a non-transitory computer readable medium. The non-transitory computer readable medium may store instructions that cause operations when executed by at least one data processor. The operations may include: identifying, at a development system, a plurality of dependent configuration data associated with a first transport request, the one or more dependent configuration data implementing a customization to a software application hosted at a production system; sending, to the production system, a reference table identifying the plurality of dependent configuration data; in response to receiving the reference table at the production system, determining, at the production system, that at least one of the plurality of dependent configuration data included in the reference table is absent from the production system; sending, to the development system, a missing object list identifying the at least one of the plurality of dependent configuration data determined to be absent from the production system; and in response to receiving the missing object list at the production system, performing, at the production system, a corrective action such that the at least one of the plurality of dependent configuration data identified by the missing object list is sent to the production system as part of the first transport request and/or a second transport request.

In some variations, one or more of the features disclosed herein including the following features can optionally be included in any feasible combination. The plurality of dependent configuration data may include a programming code, a schema of one or more database tables operated upon by the programing code, and a content of the one or more database tables.

In some variations, the operations may further include: determining, at the production system, whether the at least one of the plurality of dependent configuration data is included in another transport request destined for the production system; in response to determining that the at least one of the plurality of dependent configuration data is included in the second transport request destined for the production system, generating a first alert to send, to the production system, the second transport request prior to sending the first transport request; and in response to determining that the at least one of the plurality of dependent configuration data is not included in another transport request destined for the production system, generating a second alert to include, in the first transport request, the at least one of the plurality of dependent configuration data.

In some variations, the customization may include an addition, removal, and/or a modification of one or more functionalities of the software application. The software application may operate on one or more database tables in order to perform the one or more functionalities. The software application may be implemented based on a template defining the one or more database tables.

In some variations, the software application may be an enterprise resource planning (ERP) software application, a customer relationship management (CRM) software application, and/or a supply chain management (SCM) software application.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the transportation of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

A cloud-based software application may operate on data stored in one or more database tables. As such, the cloud-based software application may be implemented based on a template that defines the one or more database tables including, for example, the manner in which data is stored in the database tables. Since the cloud-based software application may be delivered to different tenants with a set of default templates, each tenant may be required configure the cloud-based software application by at least selecting, based on individual requirements, a template before applying, to the selected template, one or more customizations. For example, the one or more customizations may include an addition and/or removal of a database table defined by the selected template. Alternatively and/or additionally, the one or more customizations may include a change to the manner in which data is stored in the one or more database tables as defined by the selected template. These customizations may be created in a development system prior to being deployed to a production system as part of one or more transport requests.

A complete transport request may include a variety of dependent configuration data implementing the one or more customizations at the production system. For example, a complete transport request may include a first dependent data corresponding to a programming code (e.g., grouped in packages), a second dependent data corresponding to a schema of one or more database tables operated upon by the programing code, and a third dependent data corresponding to the contents of the one or more database tables. The absence of one or more dependent configuration data, for example, any one of the first dependent data, the second dependent data, or the third dependent data, from the transport request may cause the deployment of the corresponding customizations to fail when the transport request is delivered to the production system. As such, in some example embodiments, a transport controller may be configured to mitigate errors in the transportation of configuration data. For example, the transport controller may be configured to detect when a dependent configuration data missing from a first transport request delivered to the production system. Moreover, the transport controller may be configured to ensure that the dependent configuration data missing from the first transport request is part of a second transport request for the production system.

Figure 1:
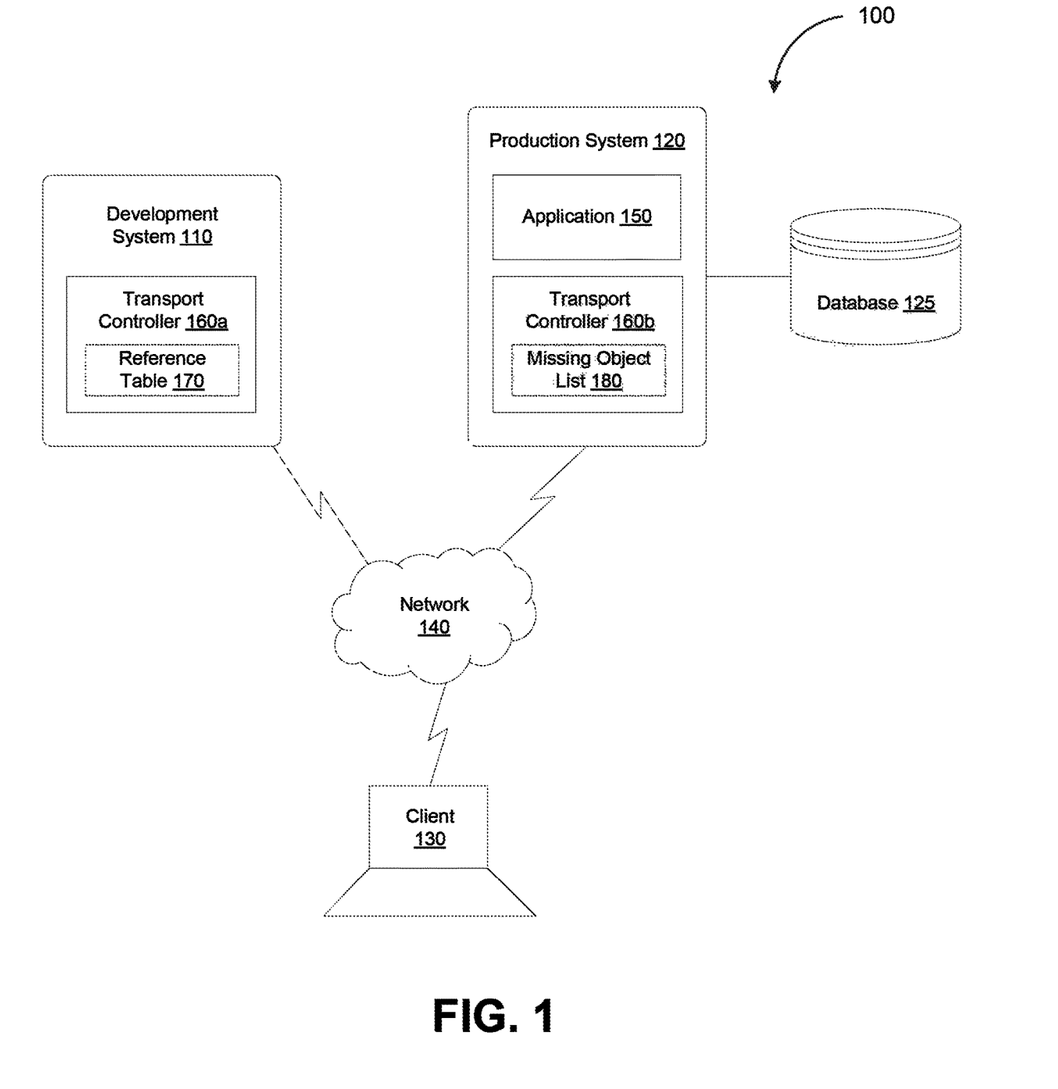
FIG. 1 depicts a system diagram illustrating an example of a configuration data transport system, in accordance with some example embodiments.

FIG. 1 depicts a system diagram illustrating an example of a configuration data transport system 100, in accordance with some example embodiments. Referring to FIG. 1, the configuration data transport system 100 may include a development system 110, a production system 120, and a client 130 coupled via a network 140. The network 140 may be a wired and/or wireless network including, for example, a wide area network (WAN), local area network (LAN), a virtual local area network (VLAN), a public land mobile network (PLMN), the Internet, and/or the like. The client 140 may be a processor based device including, for example, a laptop computer, a desktop computer, a tablet computer, a smartphone, a wearable apparatus, and/or the like. Moreover, the development system 110 and/or the production system 120 may be cloud-based systems hosted on a same cloud-computing platform or different cloud computing platforms.

A developer associated with the client 140 may access the development system 110 in order to develop one or more customizations for a cloud-based software application 150 hosted at the production system 120. The cloud-based software application 150 may be an enterprise resource planning (ERP) software application, a customer relationship management (CRM) software application, a supply chain management (SCM) software application, and/or the like. Moreover, the cloud-based software application 150 may provide a variety of data processing functionalities including, for example, payroll, time and attendance management, recruiting and onboarding, learning and development, performance and compensation, workforce planning, and/or the like.

In some example embodiments, the customizations for the cloud-based software application 150 may add, remove, and/or modify at least some of the functionalities of the cloud-based software application 150. For example, the cloud-based software application 150 may operate on data stored in one or more database tables when performing one or more functionalities. Accordingly, the cloud-based software application 150 may be implemented based on a template defining the one or more database tables including a manner in which data is stored in the one or more database tables. The one or more customizations developed at the development system 110 may thus include, for example, an addition and/or removal of a database table defined by the template. Alternatively and/or additionally, the one or more customizations developed at the development system 110 may include a change to the manner in which data is stored in the one or more database tables as defined by the template.

Table 1 below depicts pseudo programming code for a template defining the manner in which data is stored in a database table. In the example shown in Table 1, the template may include Extensible Markup Language (XML) defining the manner in which data is stored in a database table. However, it should be appreciated that the template may include a different representation of the manner in which data is stored in a database table including, for example, JavaScript Object Notation (JSON), Hypertext Markup Language (HTML), and/or the like.

TABLE 1

```
<item>
<object_name> manufacturing method </object_name>
<object_type> table_content</object_type>
<table_name>tab_manufacuring</table_name>
<field> method</field>
<content>batch</content>
<field>product</field>
<content>medicine</content>
</item>
```

In some example embodiments, deploying these customizations at the production system 120 may include sending, to the production system 120, a transport request including a first configuration data implementing the one or more customizations. Referring again to FIG. 1, the template implementing the cloud-based software application 150 may be part of a second configuration data stored in a database 125 coupled with the production system 120. As such, deploying the one or more customizations to the production system 120 may include modifying, in accordance with the first configuration data included in the transport request, the second configuration data stored in the database 125.

A complete transport request may include a variety of dependent configuration data implementing the one or more customizations at the production system 120. For example, a complete transport request may include a first dependent data corresponding to a programming code (e.g., grouped in packages), a second dependent data corresponding to a schema of one or more database tables operated upon by the programing code, and a third dependent data corresponding to the contents of the one or more database tables. The absence of one or more dependent configuration data, for example, any one of the first dependent data, the second dependent data, or the third dependent data, from the transport request may cause the deployment of the corresponding customizations to fail when the transport request is delivered to the production system 120.

As such, in some example embodiments, a transport controller 160 may be configured to mitigate errors in the transportation of configuration data from the development system 110 to the production system 120. The transport controller 160 may be configured to detect when a dependent configuration data missing from a first transport request delivered to the production system 120. For example, a first transport controller 160a at the development system 110 may generate, based at least on an analysis of the first transport request, a reference table 170 enumerating the dependent configuration data associated with one or more transport requests from the development system 110 to the production system 120 including the first transport request (e.g., programming code, database table schema, database table content, and/or the like).

The analysis of the first transport request may include identifying, for each object present in the first transport request, one or more external dependencies. For example, for the programming code included in the first transport request, the first transport controller 160a may identify one or more calls to programming code in different classes and/or function groups, database statements to database tables, usage of database objects (e.g., tables, data elements, and/or data domains), and/or the like. For the database table schema included in the first transport request, the first transport controller 160a may identify usage of data elements and/or data domains. Alternatively and/or additionally, for the database table content included in the first transport request, the first transport controller 160a may identify references to other database table content, for example, via foreign keys.

In some example embodiments, the transport controller 160 may be configured to ensure that the dependent configuration data missing from the first transport request is part of a second transport request for the production system 120. For instance, prior to sending the first transport request to the production system 120, a second transport controller 160b at the production system 120 may determine whether any of the dependent configuration data enumerated in the reference table 170 is already present at the production system 120. The second transport controller 160b may further generate a missing object list 180 identifying the dependent configuration data absent from the production system 120.

According to some example embodiments, the first transport controller 160a may perform, based at least on the missing object list 180, one or more corrective actions to ensure that the dependent configuration data missing from the production system 120 are included in either the first transport request or a second transport request. For example, if the first transport controller 160a determines that the missing dependent configuration data is not included in a transport request destined for the production system 120, the one or more corrective actions may include generating an alert to add the missing dependent configuration data to the first transport request. Alternatively, if the first transport controller 160a determines that the missing dependent configuration data is part of the second transport request, the one or more corrective actions may include an alert to release and/or import the second transport request prior to the first transport request. It should be appreciated that a developer associated with the client 140 may release a transport request from the development system 110 to the production system 120 before the transport request may be imported into the production system 120, for example, upon authorization from an administrator of the production system 120.

Figure 2:
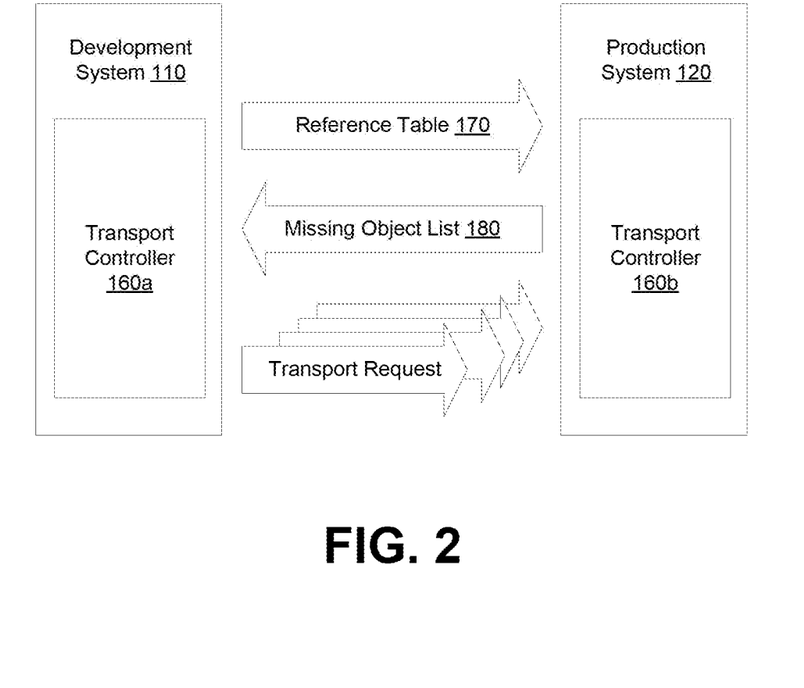
FIG. 2 depicts a block diagram illustrating an example of a dataflow between a development system to a production system, in accordance with some example embodiments.

FIG. 2 depicts a block diagram illustrating an example of a data flow between the development system 110 and the production system 120, in accordance with some example embodiments. Referring to FIGS. 1-2, the first transport controller 160a at the development system 110 may generate, based at least on an analysis of the first transport request, the reference table 170 to enumerate the dependent configuration data associated with the first transport request (e.g., programming code, database table schema, database table content, and/or the like). Moreover, the first transport controller 160a at the production system 110 may send, to the development system 120, the reference table 170. The first transport controller 160a may send, to the production system 110, the reference table 170 prior to sending the first transport request to the production system 120.

Upon receiving the reference table 170 from the development system 110, the second transport controller 160b at the production system 120 may determine whether any of the dependent configuration data enumerated in the reference table 170 is already present at the production system 120. The second transport controller 160b may further generate the missing object list 180 identifying the dependent configuration data absent from the production system 120. As shown in FIG. 2, the second transport controller 160b may send, to the development system 110, the missing object list 180. In response to receiving the missing object list 180 from the production system 120, the first transport controller 160a may perform one or more corrective actions to ensure that the dependent configuration data missing from the production system 120 are included in either the first transport request or the second transport request. For instance, if the first transport controller 160a determines that the missing dependent configuration data is not included in a transport request destined for the production system 120, the one or more corrective actions may include generating an alert to add the missing dependent configuration data to the first transport request. Alternatively, if the first transport controller 160a determines that the missing dependent configuration data is part of the second transport request, the one or more corrective actions may include an alert to release and/or import the second transport request prior to the first transport request. As shown in FIG. 2, one or more transport request may be sent from the development system 110 to the production system 120 in order to deploy, at the production system 120, customizations adding, removing, and/or modifying at least some of the functionalities of the cloud-based software application 150 hosted by the production system 120.

Figure 3:
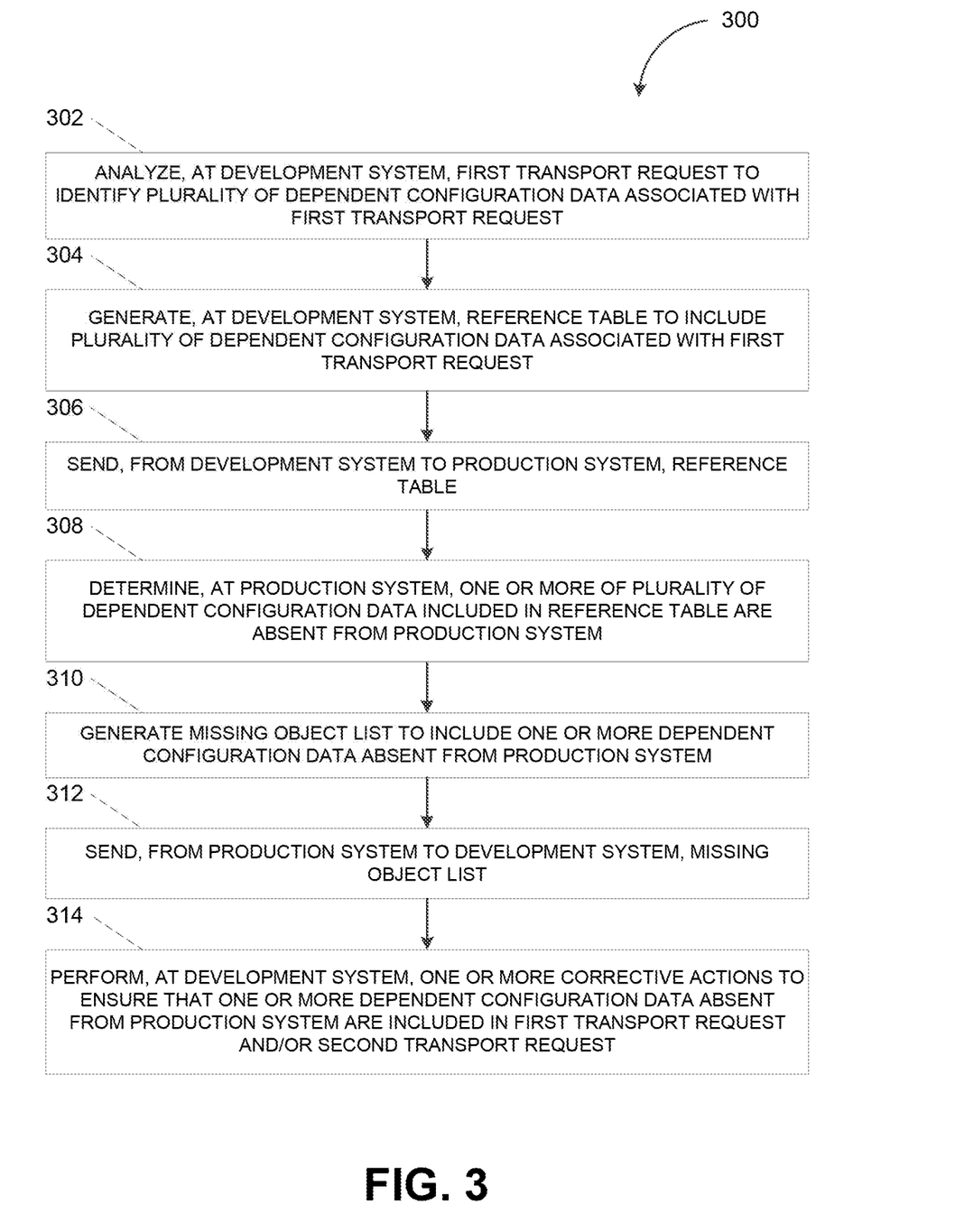
FIG. 3 depicts a flowchart illustrating an example of a process for mitigating errors in the transportation of configuration data from a development system to a production system, in accordance with some example embodiments.

FIG. 3 depicts a flowchart illustrating an example of a process 300 for mitigating errors in the transportation of configuration data from a development system to a production system, in accordance with some example embodiments. Referring to FIGS. 1-3, the process 300 may be performed by the transport controller 160 including, for example, the first transport controller 160a at the development system 110 and the second transport controller 160b at the production system 120, in order to mitigate errors in the transportation of configuration data from the development system 110 to the production system 120.

At 302, the first transport controller 160a at the development system 110 may analyze a first transport request to identify a plurality of dependent configuration data associated with the first transport request. In some example embodiments, a complete transport request may include a variety of dependent configuration data implementing the one or more customizations at the production system 120. For example, a complete transport request may include the first dependent data corresponding to a programming code (e.g., grouped in packages), the second dependent data corresponding to a schema of one or more database tables operated upon by the programing code, and the third dependent data corresponding to the contents of the one or more database tables. As such, the first transport controller 160*a* may analyze the first transport request to determine if one or more of the first dependent data, the second dependent data, and the third dependent data are absent from the first transport request.

The analysis of the first transport request may include identifying, for each object present in the first transport request, one or more external dependencies. For example, for the programming code included in the first transport request, the first transport controller 160*a* may identify one or more calls to programming code in different classes and/or function groups, database statements to database tables, usage of database objects (e.g., tables, data elements, and/or data domains), and/or the like. For the database table schema included in the first transport request, the first transport controller 160*a* may identify usage of data elements and/or data domains. Alternatively and/or additionally, for the database table content included in the first transport request, the first transport controller 160*a* may identify references to other database table content, for example, via foreign keys.

At 304, the first transport controller 160*a* at the development system 110 may generate, based at least on the analysis, the reference table 170 to include the plurality of dependent configuration data associated with the first transport request. At 306, the first transport controller 160*a* at the development system 110 may send, to the production system 120, the reference table 170. For example, as shown in FIGS. 1-2, the first transport controller 160*a* may generate the reference table 170 to enumerate the dependent configuration data associated with the first transport request including, for example, the first dependent data corresponding to a programming code (e.g., grouped in packages), the second dependent data corresponding to a schema of one or more database tables operated upon by the programing code, and the third dependent data corresponding to the contents of the one or more database tables. The reference table 170 may be sent to the production system 120 prior to the first transport request.

At 308, the second transport controller 160*b* at the production system 120 may determine that one or more of the plurality of dependent configuration data included in the reference table 170 are absent from the production system 120. For example, the second transport controller 160*b* may determine, based at least on the reference table 170, whether one or more of the first dependent data corresponding to a programming code (e.g., grouped in packages), the second dependent data corresponding to a schema of one or more database tables operated upon by the programing code, and the third dependent data corresponding to the contents of the one or more database tables are already present at the production system 120.

At 310, the second transport controller 160*b* at the production system 110 may generate the missing object list 180 to include the one or more dependent configuration data absent from the production system 120. At 312, the second transport controller 160*b* at the production system 110 may send, to the development system 110, the missing object list 180. For example, in some example embodiments, the second transport controller 160*b* may generate the missing object list 180 to include one or more of the first dependent data corresponding to a programming code (e.g., grouped in packages), the second dependent data corresponding to a schema of one or more database tables operated upon by the programing code, and the third dependent data corresponding to the contents of the one or more database tables not already present at the production system 120. The missing object list 180 may be sent to the development system 110 ahead of the first transport request in order to ensure that the dependent configuration data associated with the first transport request are sent to the production system 120 in the first transport request and/or a second transport request.

At 314, the first transport controller 160*a* may perform, based at least on the missing object list 180, one or more corrective actions to ensure that the one or more dependent configuration data absent from the production system 120 are included in the first transport request and/or a second transport request. For example, if the first transport controller 160*a* determines that the missing dependent configuration data is not included in a transport request destined for the production system 120, the one or more corrective actions may include generating an alert to add the missing dependent configuration data to the first transport request. Alternatively, if the first transport controller 160*a* determines that the missing dependent configuration data is part of the second transport request, the one or more corrective actions may include an alert to release and/or import the second transport request prior to the first transport request. As shown in FIG. 2, one or more transport request may be sent from the development system 110 to the production system 120 in order to deploy, at the production system 120, customizations adding, removing, and/or modifying at least some of the functionalities of the cloud-based software application 150 hosted by the production system 120.

Figure 4:
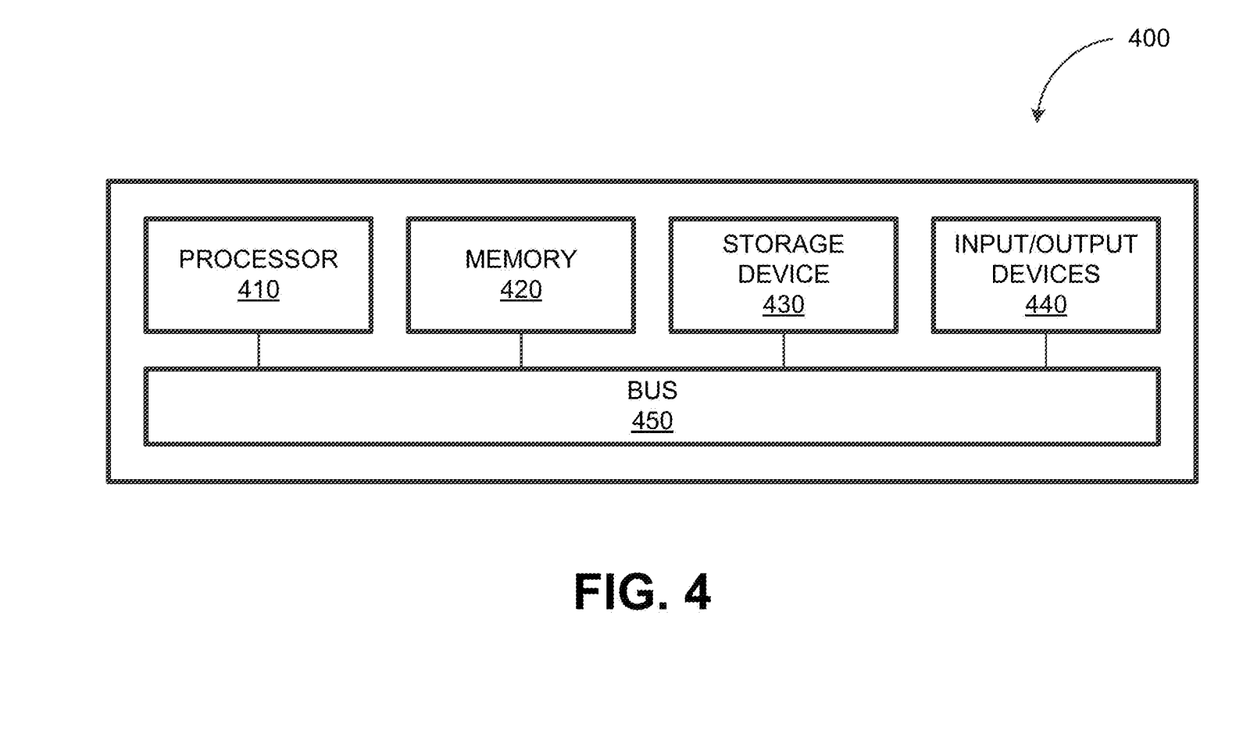
FIG. 4 depicts a block diagram illustrating an example of a computing system, in accordance with some example embodiments.

FIG. 4 depicts a block diagram illustrating a computing system 400 consistent with implementations of the current subject matter. Referring to FIGS. 1-4, the computing system 400 can be used to implement the transport controller 150 and/or any components therein.

As shown in FIG. 4, the computing system 400 can include a processor 410, a memory 420, a storage device 430, and input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the transport controller 150. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A system, comprising:
  at least one data processor; and
  at least one memory storing instructions, which when executed by the at least one data processor, result in operations comprising:
    identifying, at a development system, a plurality of dependent configuration data associated with a first transport request, the plurality of dependent configuration data implementing a customization to a software application hosted at a production system, and the customization to the software application being unable to be deployed at the production system if any of the plurality of dependent configuration data are absent from the first transport request;
    sending, to the production system, a reference table identifying the plurality of dependent configuration data;

in response to receiving the reference table at the production system, determining, at the production system, that at least one of the plurality of dependent configuration data included in the reference table is absent from the production system;

sending, to the development system, a missing object list identifying the at least one of the plurality of dependent configuration data determined to be absent from the production system; and in response to receiving the missing object list at the production system, performing, at the production system, a corrective action such that the at least one of the plurality of dependent configuration data identified by the missing object list is sent to the production system as part of the first transport request and/or a second transport request.

2. The system of claim 1, wherein the plurality of dependent configuration data includes a programming code, a schema of one or more database tables operated upon by the programing code, and a content of the one or more database tables.

3. The system of claim 1, further comprising:
determining, at the production system, whether the at least one of the plurality of dependent configuration data is included in another transport request destined for the production system.

4. The system of claim 3, further comprising:
in response to determining that the at least one of the plurality of dependent configuration data is included in the second transport request destined for the production system, generating an alert to send, to the production system, the second transport request prior to sending the first transport request.

5. The system of claim 3, further comprising:
in response to determining that the at least one of the plurality of dependent configuration data is not included in another transport request destined for the production system, generating an alert to include, in the first transport request, the at least one of the plurality of dependent configuration data.

6. The system of claim 1, wherein the customization comprises an addition, removal, and/or a modification of one or more functionalities of the software application.

7. The system of claim 6, wherein the software application operates on one or more database tables in order to perform the one or more functionalities, and wherein the software application is implemented based on a template defining the one or more database tables.

8. The system of claim 1, wherein the plurality of dependent configuration data includes a first dependent data corresponding to a programming code, a second dependent data corresponding to a schema of one or more database tables operated upon by the programming code, and a third dependent data corresponding to a content of the one or more database tables.

9. A computer-implemented method, comprising:
identifying, at a development system, a plurality of dependent configuration data associated with a first transport request, the plurality of dependent configuration data implementing a customization to a software application hosted at a production system, and the customization to the software application being unable to be deployed at the production system if any of the plurality of dependent configuration data are absent from the first transport request;

sending, to the production system, a reference table identifying the plurality of dependent configuration data;

in response to receiving the reference table at the production system, determining, at the production system, that at least one of the plurality of dependent configuration data included in the reference table is absent from the production system;

sending, to the development system, a missing object list identifying the at least one of the plurality of dependent configuration data determined to be absent from the production system; and in response to receiving the missing object list at the production system, performing, at the production system, a corrective action such that the at least one of the plurality of dependent configuration data identified by the missing object list is sent to the production system as part of the first transport request and/or a second transport request.

10. The method of claim 9, wherein the plurality of dependent configuration data includes a programming code, a schema of one or more database tables operated upon by the programing code, and a content of the one or more database tables.

11. The method of claim 9, further comprising:
determining, at the production system, whether the at least one of the plurality of dependent configuration data is included in another transport request destined for the production system;

in response to determining that the at least one of the plurality of dependent configuration data is included in the second transport request destined for the production system, generating a first alert to send, to the production system, the second transport request prior to sending the first transport request; and in response to determining that the at least one of the plurality of dependent configuration data is not included in another transport request destined for the production system, generating a second alert to include, in the first transport request, the at least one of the plurality of dependent configuration data.

12. The method of claim 9, wherein the customization comprises an addition, removal, and/or a modification of one or more functionalities of the software application.

13. The method of claim 12, wherein the software application operates on one or more database tables in order to perform the one or more functionalities, and wherein the software application is implemented based on a template defining the one or more database tables.

14. The method of claim 9, wherein the plurality of dependent configuration data includes a first dependent data corresponding to a programming code, a second dependent data corresponding to a schema of one or more database tables operated upon by the programming code, and a third dependent data corresponding to a content of the one or more database tables.

15. A non-transitory computer readable medium storing instructions, which when executed by at least one data processor, result in operations comprising:
identifying, at a development system, a plurality of dependent configuration data associated with a first transport request, the plurality of dependent configuration data implementing a customization to a software application hosted at a production system, and the customization to the software application being unable to be deployed at the production system if any of the plurality of dependent configuration data are absent from the first transport request;

sending, to the production system, a reference table identifying the plurality of dependent configuration data;

in response to receiving the reference table at the production system, determining, at the production system, that at least one of the plurality of dependent configuration data included in the reference table is absent from the production system;

sending, to the development system, a missing object list identifying the at least one of the plurality of dependent configuration data determined to be absent from the production system; and in response to receiving the missing object list at the production system, performing, at the production system, a corrective action such that the at least one of the plurality of dependent configuration data identified by the missing object list is sent to the production system as part of the first transport request and/or a second transport request.

16. The non-transitory computer readable medium of claim 15, wherein the plurality of dependent configuration data includes a programming code, a schema of one or more database tables operated upon by the programing code, and a content of the one or more database tables.

17. The non-transitory computer readable medium of claim 15, wherein the operations further comprises:

determining, at the production system, whether the at least one of the plurality of dependent configuration data is included in another transport request destined for the production system;

in response to determining that the at least one of the plurality of dependent configuration data is included in the second transport request destined for the production system, generating a first alert to send, to the production system, the second transport request prior to sending the first transport request; and in response to determining that the at least one of the plurality of dependent configuration data is not included in another transport request destined for the production system, generating a second alert to include, in the first transport request, the at least one of the plurality of dependent configuration data.

18. The non-transitory computer readable medium of claim 15, wherein the customization comprises an addition, removal, and/or a modification of one or more functionalities of the software application.

19. The non-transitory computer readable medium of claim 18, wherein the software application operates on one or more database tables in order to perform the one or more functionalities, and wherein the software application is implemented based on a template defining the one or more database tables.

20. The non-transitory computer readable medium of claim 15, wherein the plurality of dependent configuration data includes a first dependent data corresponding to a programming code, a second dependent data corresponding to a schema of one or more database tables operated upon by the programing code, and a third dependent data corresponding to a content of the one or more database tables.

* * * * *